(12) United States Patent
Wakizono

(10) Patent No.: US 9,994,077 B2
(45) Date of Patent: Jun. 12, 2018

(54) PNEUMATIC TIRE

(71) Applicant: SUMITOMO RUBBER INDUSTRIES, LTD., Kobe-shi, Hyogo (JP)

(72) Inventor: Aya Wakizono, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 97 days.

(21) Appl. No.: 15/101,818

(22) PCT Filed: Nov. 26, 2014

(86) PCT No.: PCT/JP2014/081256
§ 371 (c)(1),
(2) Date: Jun. 3, 2016

(87) PCT Pub. No.: WO2015/098408
PCT Pub. Date: Jul. 2, 2015

(65) Prior Publication Data
US 2016/0368326 A1 Dec. 22, 2016

(30) Foreign Application Priority Data

Dec. 27, 2013 (JP) .................................. 2013-271788

(51) Int. Cl.
*B60C 11/03* (2006.01)
*B60C 11/12* (2006.01)

(52) U.S. Cl.
CPC ...... *B60C 11/0302* (2013.01); *B60C 11/0304* (2013.01); *B60C 11/0306* (2013.01);
(Continued)

(58) Field of Classification Search
CPC ............. B60C 11/0302; B60C 11/0304; B60C 11/0306; B60C 2011/0346;
(Continued)

(56) References Cited

U.S. PATENT DOCUMENTS

| 4,461,334 A * | 7/1984 | Tansei ..................... B60C 11/11 |
| | | 152/209.26 |
| 2009/0255614 A1* | 10/2009 | Ebiko ................. B60C 11/0302 |
| | | 152/209.8 |

(Continued)

FOREIGN PATENT DOCUMENTS

| EP | 2108531 A2 | 10/2009 |
| EP | 2671710 A1 | 12/2013 |

(Continued)

OTHER PUBLICATIONS

Extended European Search Report, dated Jul. 19, 2017, for European Application No. 14875589.5.

*Primary Examiner* — Eric Hug
(74) *Attorney, Agent, or Firm* — Birch, Stewart, Kolasch & Birch, LLP

(57) ABSTRACT

Provided is a pneumatic tire having high snow road performance. Provided is a pneumatic tire, the direction of mounting of which to a vehicle is specified. A tread section has formed therein an outer shoulder main groove which extends in a zigzag pattern, an outer middle main groove, outer shoulder lateral grooves, and outer middle lateral grooves. As a result, outer shoulder lands and outer middle lands are formed on the tread section. The outer shoulder lands are provided with outer shoulder lug grooves, and the outer middle lands are provided with outer middle lug grooves. The outer shoulder lateral grooves and the outer middle lug grooves are smoothly connected through the outer shoulder main groove. The outer middle lateral grooves and the outer (Continued)

shoulder lug grooves are smoothly connected through the outer shoulder main groove.

13 Claims, 10 Drawing Sheets

(52) U.S. Cl.
CPC ... *B60C 11/1236* (2013.01); *B60C 2011/0346* (2013.01); *B60C 2011/0353* (2013.01); *B60C 2011/0365* (2013.01); *B60C 2011/0381* (2013.01); *B60C 2011/0388* (2013.01); *B60C 2011/1213* (2013.01)

(58) Field of Classification Search
CPC ..... B60C 2011/0353; B60C 2011/0365; B60C 2011/0381; B60C 2011/0388
USPC ..... 152/209.1, 209.8, 209.9, 209.16, 209.18, 152/902
See application file for complete search history.

(56) References Cited

U.S. PATENT DOCUMENTS

| | | | |
|---|---|---|---|
| 2010/0139826 A1 | 6/2010 | Matsumoto | |
| 2013/0087261 A1 | 4/2013 | Kageyama | |
| 2013/0306208 A1* | 11/2013 | Kageyama | B60C 11/01 152/209.16 |
| 2013/0328240 A1* | 12/2013 | Takahashi | B29D 30/0601 264/293 |

FOREIGN PATENT DOCUMENTS

| | | | |
|---|---|---|---|
| JP | 7-323705 | * | 12/1995 |
| JP | 7-323705 | A | 12/1995 |
| JP | 2005-153813 | * | 6/2005 |
| JP | 2005-153813 | A | 6/2005 |
| JP | 2010-132236 | A | 6/2010 |
| JP | 2013-82308 | A | 5/2013 |
| JP | 2013-252690 | A | 12/2013 |

* cited by examiner

PNEUMATIC TIRE

TECHNICAL FIELD

The present invention relates to a pneumatic tire having an excellent on-snow performance.

BACKGROUND ART

In winter tires, it has been requested to improve on-snow performance. In order to improve on-snow performance, a pneumatic tire including a tread portion provided with lateral grooves and lug grooves with a large groove volume has been proposed, for example. Such a tire may exert large snow-shearing force by the lateral grooves and lug grooves. Unfortunately, recent years, a pneumatic tire having much better on-snow performance has been requested.

CITATION LIST

Patent Literature

Patent Document 1: Japanese Unexamined Patent Application Publication No. 2013-82308

SUMMARY OF INVENTION

Technical Problem

The present invention has been made in view of circumstances as described above, and has a major object to provide a pneumatic tire having an excellent on-snow performance by basically improving an outboard shoulder main groove, outboard shoulder lateral grooves, outboard shoulder lug grooves, outboard middle lateral grooves and outboard middle lug grooves.

Solution to Problem

The present invention provides a pneumatic tire including a tread portion having an installing direction to a vehicle to have an outboard tread edge and an inboard tread edge, the tread portion being provided with a circumferentially and continuously extending zigzag outboard shoulder main groove on a nearest side of the outboard tread edge, a circumferentially and continuously extending outboard middle main groove between the outboard shoulder main groove and a tire equator, a plurality of outboard shoulder lateral grooves connecting the outboard tread edge and the outboard shoulder main groove and a plurality of outboard middle lateral grooves connecting the outboard middle main groove and the outboard shoulder main groove, thereby the tread portion including an outboard shoulder land portion including a circumferentially arranged outboard shoulder blocks defined by the outboard shoulder main groove, the outboard tread edge and the outboard shoulder lateral grooves and an outboard middle land portion including circumferentially arranged outboard middle blocks defined by the outboard shoulder main groove, the outboard middle main groove and the outboard middle lateral grooves, the outboard shoulder blocks provided with outboard shoulder lug grooves extending axially outwardly from the outboard shoulder main groove and terminating within the outboard shoulder blocks, the outboard middle blocks provided with outboard middle lug grooves extending axially inwardly from the outboard shoulder main groove and terminating within the outboard middle blocks, the outboard shoulder lateral grooves being continuous to the outboard middle lug grooves smoothly through the outboard shoulder main groove, and the outboard middle lateral grooves being continuous to the outboard shoulder lug grooves smoothly through the outboard shoulder main groove.

In the pneumatic tire according to the invention, preferably, the outboard shoulder lateral grooves are in communication with outer zigzag vertexes, which protrude axially outwardly, of the outboard shoulder main groove, and the outboard middle lateral grooves are in communication with inner zigzag vertexes, which protrude axially inwardly, of the outboard shoulder main groove.

In the pneumatic tire according to the invention, preferably, the tread portion is further provided with a circumferentially and continuously extending inboard shoulder main groove on a nearest side of the inboard tread edge, a circumferentially and continuously extending inboard middle main groove between the inboard shoulder main groove and the tire equator and a plurality of inboard middle lateral grooves connecting the inboard shoulder main groove and the inboard middle main groove, and the inboard middle lateral grooves and the outboard middle lateral grooves are alternately arranged in a circumferential direction of the tire.

In the pneumatic tire according to the invention, preferably, the tread portion includes an inboard shoulder land portion between the inboard shoulder main groove and the inboard tread edge, the inboard shoulder land portion is provided with inboard shoulder slots extending axially outwardly from the inboard shoulder main groove and terminating within the inboard shoulder land portion, the inboard shoulder slots are continuous to the inboard middle lateral grooves smoothly through the inboard shoulder main groove.

In the pneumatic tire according to the invention, preferably, the tread portion includes a central land portion between the inboard middle main groove and the outboard middle main groove, the central land portion is provided with central slots extending axially inwardly from the inboard middle main groove and terminating within the central land portion, and the central slots are continuous to the inboard middle lateral grooves smoothly through the inboard middle main groove.

In the pneumatic tire according to the invention, preferably, each of the outboard shoulder lateral grooves and the outboard middle lateral grooves includes a portion having a width increasing gradually axially outwardly.

In the pneumatic tire according to the invention, preferably, the outboard shoulder lateral grooves incline in an opposite direction to the outboard middle lateral grooves.

Advantageous Effects of Invention

In the pneumatic tire according to the invention, the tread portion is provided with the circumferentially and continuously extending zigzag outboard shoulder main groove on a nearest side of the outboard tread edge, the outboard shoulder lateral grooves connecting the outboard tread edge and the outboard shoulder main groove, and the outboard middle lateral grooves connecting the outboard middle main groove and the outboard shoulder main groove. Furthermore, the outboard shoulder blocks are provided with axially extending outboard shoulder lug grooves. Furthermore, the outboard middle blocks are provided with axially extending outboard middle lug grooves.

The outboard shoulder main groove having a zigzag shape including an axial component. The outboard shoulder main groove, the outboard shoulder lateral grooves, the outboard middle lateral grooves, the outboard shoulder lug grooves and the outboard middle lug grooves generate snow-shearing force. Thus, the pneumatic tire according to the invention exhibits an excellent on-snow performance.

Furthermore, the outboard shoulder lateral grooves are continuous to the outboard middle lug grooves smoothly through the outboard shoulder main groove, and the outboard middle lateral grooves are continuous to the outboard shoulder lug grooves smoothly through the outboard shoulder main groove. Thus, lengthy snow columns that are continuous in the axial direction of the tire are formed through the outboard shoulder lateral grooves, the outboard middle lug grooves and the outboard shoulder main groove. Similarly, lengthy snow columns that are continuous in the axial direction of the tire are formed through the outboard middle lateral grooves, the outboard shoulder lug grooves and the outboard shoulder main groove. Accordingly, the outboard shoulder main groove, both lateral grooves and both lug grooves can generate large snow-shearing force to improve on-snow performance.

DESCRIPTION OF EMBODIMENTS

Figure 1:
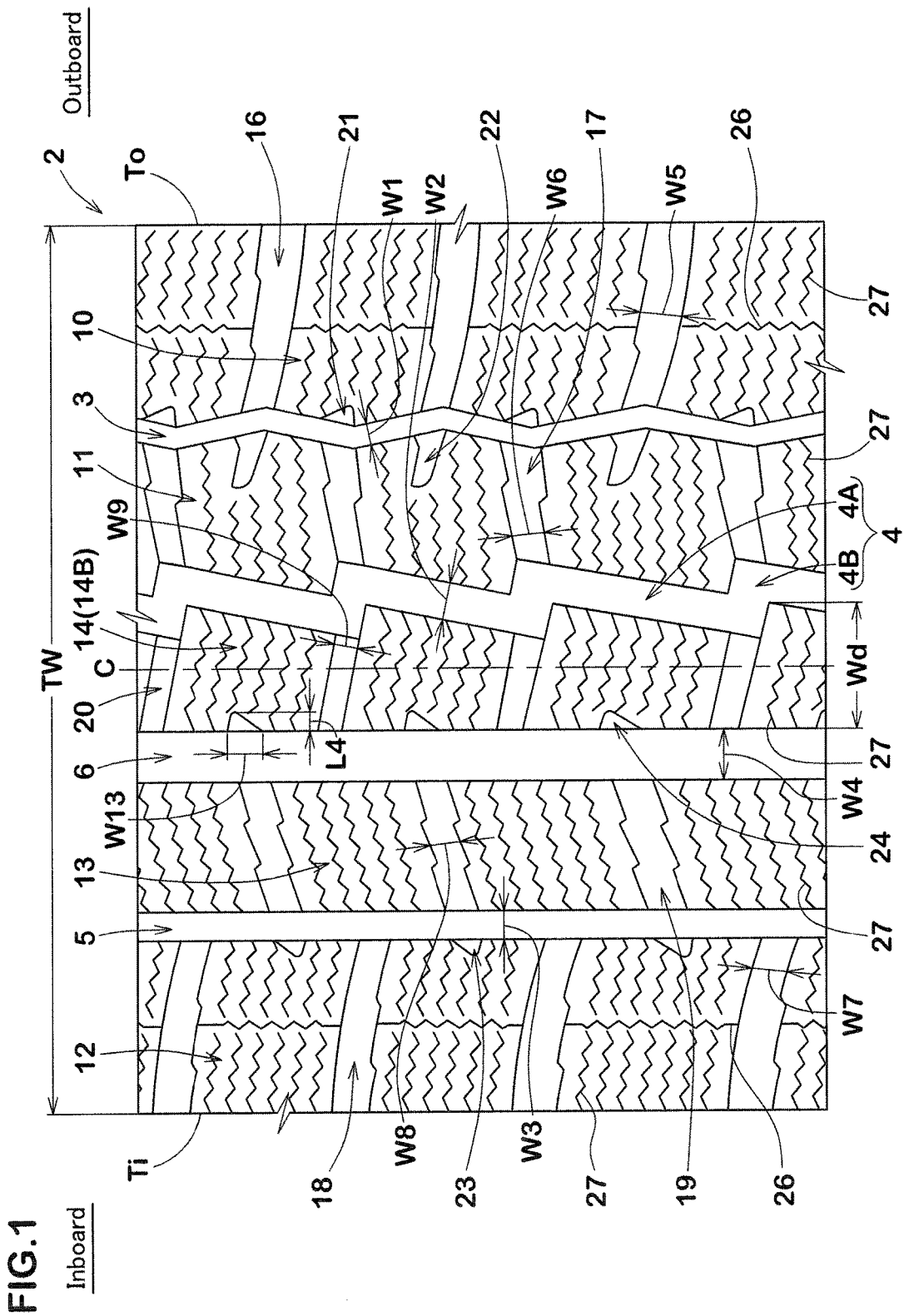
FIG. 1 is a development view of a tread portion illustrating an embodiment of the present invention.

Hereinafter, an embodiment of the present invention will be explained based on the drawings. FIG. 1 illustrates a developed view of a tread portion 2 of a pneumatic tire in accordance with an embodiment of the present invention. As illustrated in FIG. 1, the pneumatic tire (hereinafter, simply referred to as "tire".) of the present embodiment can be suitably used for a studless tire for passenger cars.

The tire according to the embodiment includes an asymmetrical tread pattern having a designated installing direction to a vehicle. Thus, the tread portion 2 of the tire includes an outboard tread edge To located on outboard of a vehicle when the tire is installed on the vehicle and an inboard tread edge Ti located on inboard outboard of a vehicle when the tire is installed on the vehicle. The installing direction to a vehicle is displayed on a sidewall portion (not illustrated) by characters and the like, for example.

The respective tread edges To and Ti are defined as axially outermost edges of the ground contacting patch which occurs under a standard condition of the tire 1 with a standard tire load when the camber angle of the tire is zero. The standard condition is such that the tire is mounted on a standard rim with a standard pressure but is loaded no tire load. An axial distance between the tread edge To and Ti under the standard condition is defined as the tread width TW. Unless otherwise noted, dimensions of respective portions of the tire are values measured under the standard condition.

The standard wheel rim is a wheel rim approved for each tire by standards organizations on which the tire is based, wherein the standard wheel rim is the "standard rim" specified in JATMA, the "Design Rim" in TRA, and the "Measuring Rim" in ETRTO, for example.

The standard pressure is a standard pressure approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example. In case of tires for passenger cars, the standard pressure is 180 kPa.

The standard tire load is a tire load approved for each tire by standards organizations in which the tire is based, wherein the standard tire load is the "maximum load capacity" in JATMA, the maximum value given in the above-mentioned table in TRA, the "Load Capacity" in ETRTO, for example. In case of tires for passenger cars, the standard tire load is a load corresponding to 88% of the above-mentioned load.

The tread portion 2 is provided with circumferentially and continuously extending main grooves. The main grooves according to the embodiment include an outboard shoulder main groove 3, an outboard middle main groove 4, an inboard shoulder main groove 5 and an inboard middle main groove 6.

The outboard shoulder main groove 3 is disposed on the nearest side of the outboard tread edge To in the main grooves. The outboard shoulder main groove 3 extends in a zigzag shape. Since the outboard shoulder main groove 3 includes an axial component, it generates snow-shearing force to improve traction and braking on snow.

Figure 2:
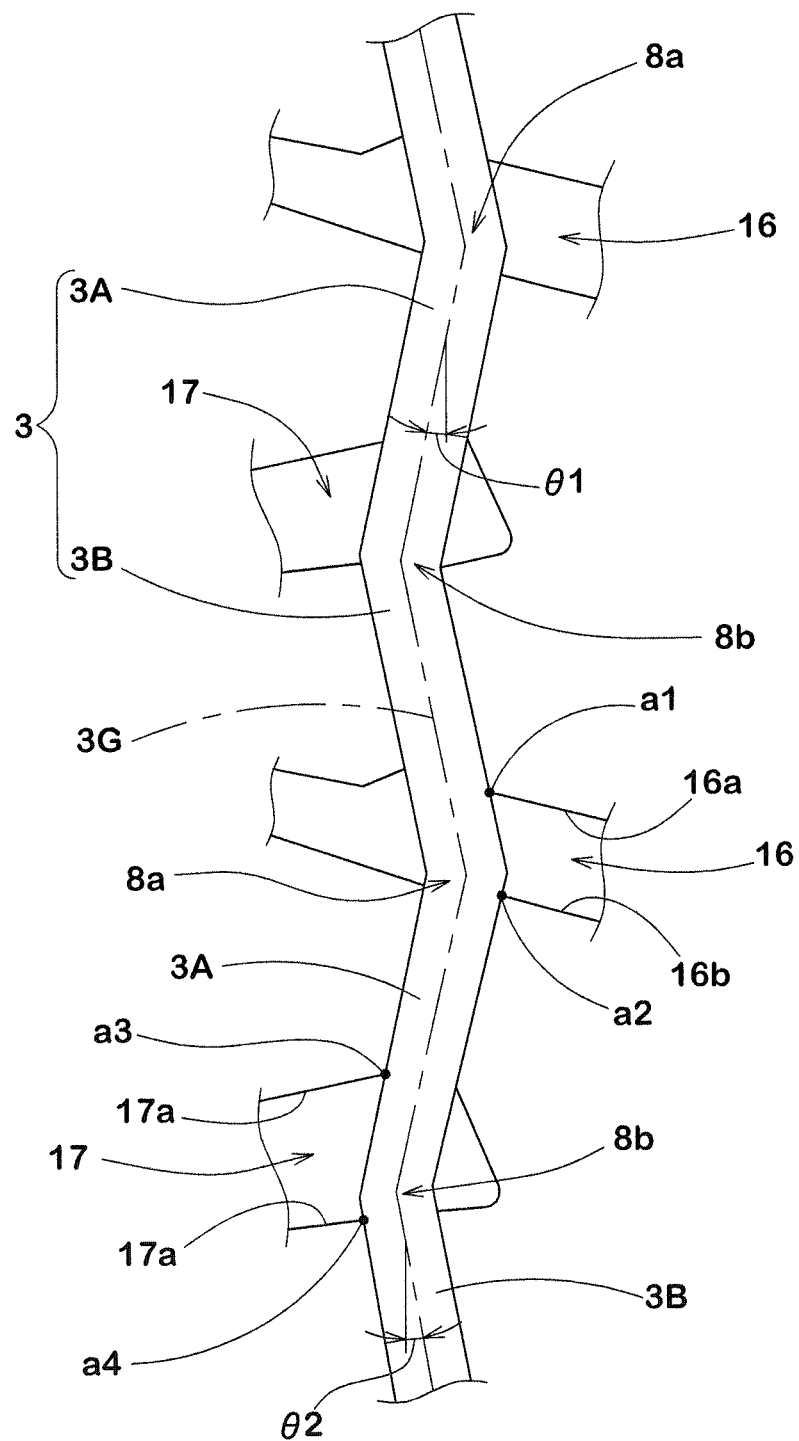
FIG. 2 is an enlarged view of an outboard shoulder main groove in FIG.

FIG. 2 illustrates an enlarged view of the outboard shoulder main groove 3. As illustrated in FIG. 2, the outboard shoulder main groove 3 includes a first portion 3A whose groove centerline 3G inclines in one side with respect to the circumferential direction of the tire and a second portion 3B whose groove centerline 3B inclines in the other side with respect to the circumferential direction of the tire, and which are arranged alternately. The groove centerline 3G is defined as a line segment that connects the middle points of groove widths of the respective portion of the outboard shoulder main groove 3, wherein the groove widths are widths measured perpendicular to the longitudinal direction of the outboard shoulder main groove 3.

The first portion 3A and the second portion 3B preferably have the respective angles θ1 and θ2 of from 5 to 20 degrees with respect to the circumferential direction of the tire. When the angles θ1 and θ2 of the first portion 3A and the second portion 3B are less than 5 degrees, the axial component of the outboard shoulder main groove 3 tends to be small, and on-snow performance may be deteriorated. When the angles θ1 and θ2 of the first portion 3A and the second portion 3B are more than 20 degrees, rigidity around the outboard shoulder main groove 3 tends to be low and thus the wear resistance may be deteriorated.

The outboard shoulder main groove 3 includes outer zigzag vertexes 8a whose groove centerline 3G protrudes axially outwardly and inner zigzag vertexes 8b whose groove centerline 3G protrudes axially inwardly.

As illustrated in FIG. 1, the outboard middle main groove 4 is disposed between the tire equator C and the outboard shoulder main groove 3. In this embodiment, the outboard middle main groove 4 is configured as a zigzag shape that includes long sides 4A inclining in a direction with respect to the circumferential direction of the tire and short sides 4B having a shorter length than the long sides 4A and inclining in an opposite direction to the long sides 4A, and which are arranged alternately. Since the outboard middle main groove 4 also includes a large axial component, on-snow performance can be improved. Alternatively, the outboard middle main groove 4 may be configured as a straight or wavy shape.

The inboard shoulder main groove 5 is disposed on the nearest side of the inboard tread edge Ti in the main grooves. In this embodiment, the inboard shoulder main groove 5 extends in a straight shape. The outboard middle main groove 4 enhances circumferential rigidity of an inboard shoulder land portion to improve straight traveling stability. Alternatively, the inboard shoulder main groove 5 may extend in a zigzag or wavy shape.

The inboard middle main groove 6 is disposed between the tire equator C and the inboard shoulder main groove 5. In this embodiment, the inboard middle main groove 6 extends in a straight shape. Alternatively, the inboard middle main groove 6 may extend in a zigzag or wavy shape.

For groove widths (groove widths are measured perpendicular to groove center lines) W1 to W4 and groove depths (not illustrated) of each main groove 3 to 6 respectively can be determined variously according to conventional manner. Preferably, groove widths W1 to W4 of the main grooves 3 to 6, for example, are in a range of from 1.0% to 7.0% of the tread width TW. In this embodiment, the groove width W2 of the outboard middle main groove 4 is smaller than the groove width W4 of the inboard middle main groove 6. Furthermore, the groove width W1 of the outboard shoulder main groove 3 is smaller than the groove width W3 of the inboard shoulder main groove 5. Thus, rigidity of an outboard land portion where large lateral force tends to act during cornering can be increased to improve steering stability. Preferably, each groove depth of the main grooves 3 to 6 of the tire for passenger cars according to the embodiment is in a range of from 5 to 10 mm, for example.

The tread portion 2 is separated into an outboard shoulder land portion 10, an outboard middle land portion 11, an inboard shoulder land portion 12, an inboard middle land portion 13 and a central land portion 14 by the main grooves 3 to 6.

Figure 3:
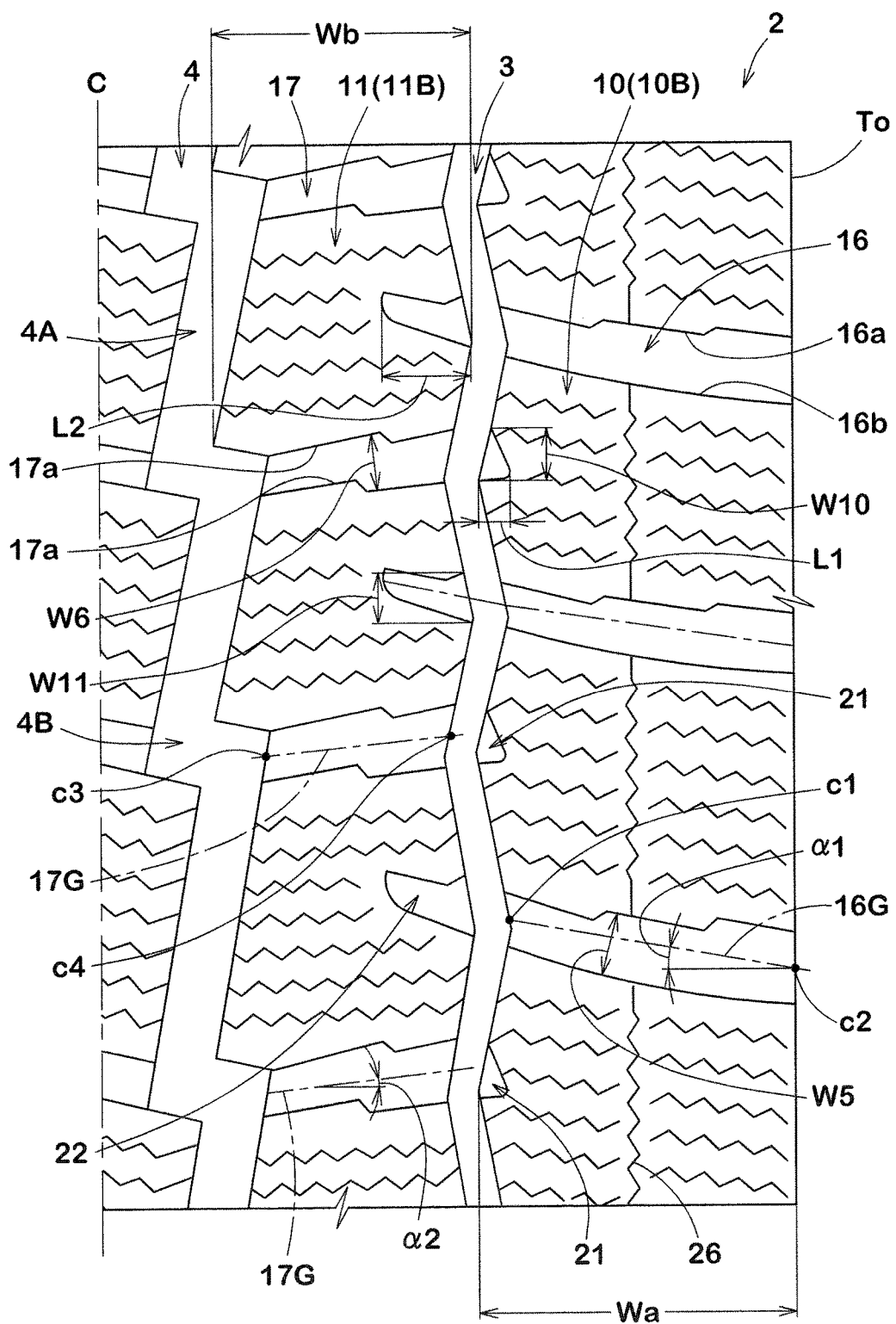
FIG. 3 is an enlarged view of the right half of the tread portion in FIG. 1.

FIG. 3 illustrates an enlarged view of the right half of the tread portion 2 in FIG. 1. As illustrated in FIG. 3, the outboard shoulder land portion 10 is disposed between the outboard shoulder main groove 3 and the outboard tread edge To.

The outboard shoulder land portion 10 is provided with outboard shoulder lateral grooves 16 connecting the outboard tread edge To and the outboard shoulder main groove 3. Thus, the outboard shoulder land portion 10 is configured as a row of blocks where outboard shoulder blocks 10B which are divided by the outboard shoulder main groove 3, the outboard tread edge To and the outboard shoulder lateral grooves 16 are arranged in the circumferential direction of the tire.

The outboard shoulder lateral grooves 16 includes portions with a groove width W5 gradually increasing axially outwardly. This structure further improve on-snow performance of the tire by promoting to discharge snow from the grooves using lateral force during cornering. The groove width of the outboard shoulder lateral grooves 16 is defined as a distance between groove edges measured perpendicular to the groove center line. The groove centerline 16G of the outboard shoulder lateral grooves 16 is defined as a straight line that connects a circumferential middle point c1 of an opening at the outboard shoulder main groove 3 and a circumferential middle point c2 of the outboard shoulder lateral grooves 16 on the outboard tread edge To. The groove center line of an inboard shoulder lateral grooves 18 which will be described later is also defined as the same.

The groove width W5 of the outboard shoulder lateral grooves 16 is preferably in a range of from 2.5% to 5.5% of the tread width TW, in order to improve the effects as described above. Similarly, a groove depth (not illustrated) of the outboard shoulder lateral grooves 16 is preferably in a range of from 3 to 8 mm, and is preferably smaller than those of the main grooves.

Each of the outboard shoulder lateral grooves 16 has a groove edge 16a extending in a zigzag shape and another groove edge 16b extending in a smooth curved shape. The outboard shoulder lateral grooves 16 provide the groove width W5 increasing axially outwardly in stages. Furthermore, the zigzag groove edge 16a of the outboard shoulder lateral grooves 16 may offer its edge effect in various directions while maintaining the rigidity around another groove edge to improve steering stability.

As illustrated in FIG. 2, the outboard shoulder lateral grooves 16 according to the embodiment are in communication with the outer zigzag vertexes 8a of the outboard shoulder main groove 3. This improves the steering stability by preventing reduction in rigidity of the outboard shoulder blocks 10B around the outer zigzag vertexes 8a. Furthermore, since lengths of the outboard shoulder lateral grooves 16 tend to be short, snow introduced in the grooves tends to be discharged easily through the outboard tread edge To. Here, "an outboard shoulder lateral groove 16 is in communication with an outer zigzag vertex 8a" means that the outer zigzag vertex 8a is located between axially inner ends $\alpha 1$ and $\alpha 2$ of the groove edges 16a and 16b respectively of the outboard shoulder lateral grooves 16 in the circumferential direction of the tire.

As illustrated in FIG. 3, an angle $\alpha 1$ of the outboard shoulder lateral grooves 16 is preferably in a range of not more than 20 degrees with respect to the axial direction of the tire. This further improves on-snow performance of the tire by maintaining sufficient rigidity of the outboard shoulder blocks so as to form a firm snow-column. The angle of the lateral grooves is an angle of the groove center line.

The outboard shoulder blocks 10B is provided with outboard shoulder lug grooves 21 extending axially outwardly from the outboard shoulder main groove 3 and terminating within the outboard shoulder blocks 10B. In this embodiment, the outboard shoulder lug grooves 21 have groove widths gradually decreasing axially outwardly.

Preferably, the outboard shoulder lug grooves 21 have an axial maximum length L1 in a range of from 5% to 15% of the maximum width Wa of the outboard shoulder land portion 10. When the maximum length L1 of the outboard shoulder lug grooves 21 is more than 15% of the maximum width Wa of the outboard shoulder land portion 10, rigidity of the outboard shoulder land portion 10 decreases, and thus the steering stability may be deteriorated. When the maximum length L1 of the outboard shoulder lug grooves 21 is less than 5% of the maximum width Wa of the outboard shoulder land portion 10, less snow-shearing force may be generated.

In order to further improve the effects as described above, a circumferential maximum groove width W10 of the outboard shoulder lug grooves 21 is preferably in a range of from 1.5% to 6.5% of the tread width TW. Furthermore, a groove depth (not illustrated) of the outboard shoulder lug grooves 21 is preferably in a range of from 8.5 to 10.5 mm.

The outboard middle land portion 11 is disposed between the outboard shoulder main groove 3 and the outboard middle main groove 4. The outboard middle land portion 11 is provided with outboard middle lateral grooves 17 connecting the outboard middle main groove 4 and the outboard shoulder main groove 3. Thus, the outboard middle land portion 11 is configured as a row of blocks where outboard middle blocks 11B which are divided by the outboard shoulder main groove 3, the outboard middle main groove 4 and the outboard middle lateral grooves 17 are arranged in the circumferential direction of the tire.

In this embodiment, the outboard middle lateral grooves 17 extends in a zigzag shape. As illustrated in FIG. 2, the outboard middle lateral grooves 17 are in communication with the inner zigzag vertexes 8b of the outboard shoulder main groove 3. The outboard middle lateral grooves 17 may improve rigidity of a land portion around the inner zigzag vertexes 8b to improve steering stability. Here, "an outboard middle lateral groove is in communication with an inner zigzag vertex 8b" means that the inner zigzag vertex 8b is located between axially outer ends $\alpha 3$ and $\alpha 4$ of the groove edges 17a and 17b respectively of the outboard middle lateral grooves 17 in the circumferential direction of the tire.

As illustrated in FIG. 3, the outboard middle lateral grooves 17 are continuous to the outboard shoulder lug grooves 21 smoothly through the outboard shoulder main groove 3. Since lengthy groove spaces in the axial direction of the tire are formed by the outboard shoulder lug grooves 21, the outboard shoulder main groove 3 and the outboard middle lateral grooves 17, large snow-shearing force can be obtained. Here, "an outboard middle lateral groove is continuous to an outboard shoulder lug groove smoothly" means that the outboard middle lateral groove is continuous to the outboard shoulder lug groove 21 when the outboard middle lateral groove 17 is expanded axially outwardly along its groove shape. In this embodiment, the groove spaces are connected to the short sides 4B.

The outboard middle lateral grooves 17 includes a portion having a groove width W6 gradually increasing axially outwardly. Thus, the snow in the outboard middle lateral grooves 17 is discharged easily to the outboard tread edge To through the outboard shoulder main groove 3. In this embodiment, the above action can be effectively obtained because the portion of the outboard middle lateral grooves 17 in which the groove width W6 gradually increases axially outwardly is disposed on the side of the outboard shoulder main groove 3.

The groove width W6 of the outboard middle lateral grooves 17 is preferably in a range of from 2.0% to 5.0% of the tread width TW, in order to further improve the action as described above. Similarly, a groove depth (not illustrated) of the outboard middle lateral grooves 17 is preferably in a range of from 3 to 9 mm, and is preferably smaller than those of the main grooves.

The outboard middle lateral grooves 17 incline in an opposite direction to the outboard shoulder lateral grooves 16. With this, lateral force in mutually opposite directions generated by the respective lateral grooves 16 and 17 are offset so that traveling stability improves. In order to further improve the effect as described above, an absolute value of the difference between an angle $\alpha 2$ of the outboard middle lateral grooves 17 with respect to the axial direction of the tire and the angle $\alpha 1$ of the outboard shoulder lateral grooves 16 with respect to the axial direction of the tire $|\alpha 1 - \alpha 2|$ is preferably in a range of not more than 20 degrees, more preferably not more than 10 degrees. Each groove centerline 17G of each outboard middle lateral groove 17 is defined as a straight line that connects circumferential middle points c3 and c4 of groove ends that open at the outboard middle main groove 4 and the outboard shoulder main groove 3, respectively. As to inboard middle lateral grooves 19 and central lateral grooves 20, the groove centerlines are defined as the same.

The angle $\alpha 2$ of the outboard middle lateral grooves 17 is preferably not more than 20 degrees, in order to form a firm snow column by increasing rigidity of land portions between one of the outboard middle lateral groove 17 and the outboard shoulder main groove 3.

The outboard middle blocks 11B are provided with outboard middle lug grooves 22 extending axially inwardly from the outboard shoulder main groove 3 and terminating within the outboard middle blocks 11B. In this embodiment, the outboard middle lug grooves 22 have a groove width gradually decreasing axially inwardly.

The outboard middle lug grooves 22 are continuous to the outboard shoulder lateral grooves 16 smoothly through the outboard shoulder main groove 3. With this, lengthy groove spaces where the outboard middle lug grooves 22, the outboard shoulder main groove 3, and the outboard shoulder lateral grooves 16 are connected are offered, and thus large snow-shearing force can be obtained. Here, "an outboard middle lug groove is continuous to an outboard shoulder lateral groove smoothly" means that the outboard shoulder lateral groove 16 is continuous to the outboard middle lug groove 22 smoothly when the outboard shoulder lateral groove is expanded axially outwardly along its groove shape.

From a viewpoint of maintaining the rigidity of the outboard middle land portion 11 while achieving the action effectively, an axial maximum length L2 of the outboard middle lug grooves 22 is preferably in a range of from 30% to 40% of the axial maximum width Wb of the outboard middle land portion 11. A circumferential maximum width W11 of the outboard middle lug grooves 22 is preferably in a range of from 1.5% to 6.5% of the tread width TW. Furthermore, a groove depth (not illustrated) of the outboard middle lug grooves 22 is preferably from 3 to 7 mm.

Figure 4:
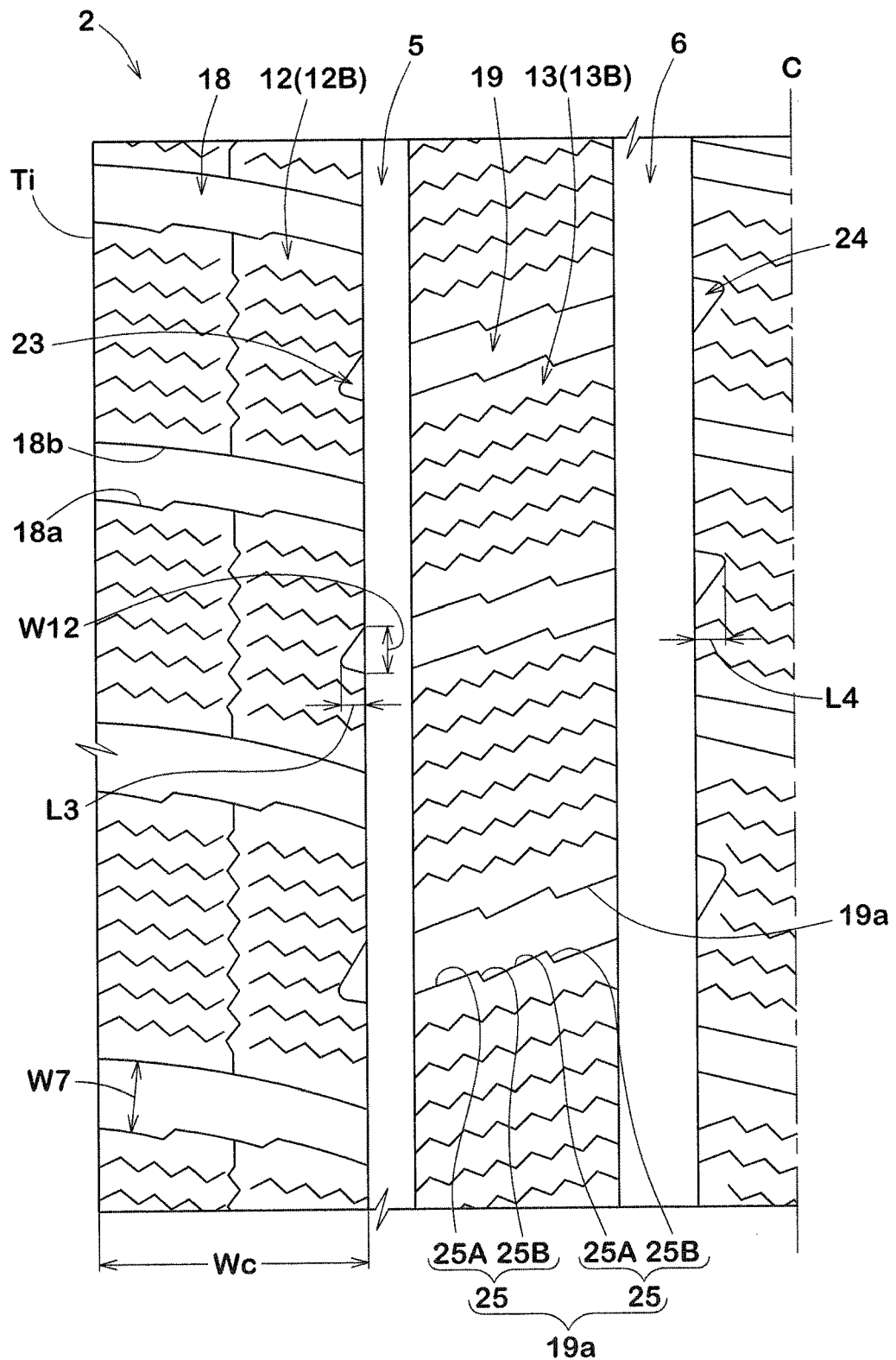
FIG. 4 is an enlarged view of the left half of the tread portion in FIG. 1.

FIG. 4 illustrates the left half of the tread portion 2 in FIG. 1. As illustrated in FIG. 4, the inboard shoulder land portion 12 is disposed between the inboard shoulder main groove 5 and the inboard tread edge Ti. The inboard shoulder land portion 12 is provided with inboard shoulder lateral grooves 18 connecting the inboard shoulder main groove 5 and the inboard tread edge Ti. Thus, the inboard shoulder land portion 12 is configured as a row of blocks where inboard shoulder blocks 12B which are divided by the inboard shoulder main groove 5, the inboard tread edge Ti and the inboard shoulder lateral grooves 18 are arranged in the circumferential direction of the tire.

In this embodiment, each of the inboard shoulder lateral groove 18 includes a groove edge 18a extending in a zigzag shape and another groove edge 18b extending in a smooth curved shape. Each inboard shoulder lateral groove 18 includes a portion having a groove width increasing axially outwardly in stages. With this, the snow in the inboard shoulder lateral grooves 18 would be discharged easily to further improve on-snow performance of the tire.

Preferably, the inboard shoulder lateral grooves 18 have a groove width W7 of from 2.5% to 5.5% of the tread width TW. Similarly, the inboard shoulder lateral grooves 18 preferably have a groove depth (not illustrated) of from 3 to 8 mm, more preferably being smaller than those of the main grooves.

The inboard shoulder blocks 12B are provided with inboard shoulder slots 23 extending axially outwardly from the inboard shoulder main groove 5 and terminating within the inboard shoulder land portion 12. In this embodiment, the inboard shoulder slots 23 have a groove width decreasing toward axially outwardly.

Preferably, an axial maximum length L3 of the inboard shoulder slots 23 is from 5% to 15% of the axial maximum width We of the inboard shoulder land portion 12. Preferably, a circumferential maximum width W12 of the inboard shoulder slots 23 is in a range of from 2% to 7% of the tread width TW. Furthermore, the inboard shoulder slots 23 preferably have a groove depth (not illustrated) of from 3 to 7 mm.

The inboard middle land portion 13 is disposed between the inboard shoulder main groove 5 and the inboard middle main groove 6. The inboard middle land portion 13 is provided with inboard middle lateral grooves 19 connecting the inboard shoulder main groove 5 and the inboard middle main groove 6. Thus, the inboard middle land portion 13 is configured as a row of blocks where inboard middle blocks 13B which are divided by the inboard shoulder main groove 5, the inboard middle main groove 6 and the inboard middle lateral groove 19 are arranged in the circumferential direction of the tire.

The inboard middle lateral grooves 19 extend in a zigzag shape.

In this embodiment, the inboard middle lateral grooves 19 includes a pair of groove edges 19a and 19a each of which includes at least two bent elements 25 (e.g., two in this embodiment). Each bent element 25 includes a first element 25A inclining in one side with respect to the axial direction of the tire and a second element 25B inclining in an opposite side to the first element 25A and having a shorter length than the first element 25A. By providing the inboard middle lateral grooves 19 between the inboard shoulder main groove 5 and the inboard middle main groove 6, the snow introduced in the inboard middle lateral grooves 19 is firmly held at an initial cornering stage. Accordingly, snow-shearing force can be increased at the initial cornering stage to improve the on-snow performance.

The inboard middle lateral grooves 19 are continuous to the inboard shoulder slots 23 smoothly through the inboard shoulder main groove 5. With this, lengthy groove spaces where the inboard middle lateral grooves 19, the inboard shoulder main groove 5 and the inboard shoulder slots 23 are connected are offered, and thus large snow-shearing force can be obtained. Here, "an inboard middle lateral groove is continuous to an inboard shoulder slot smoothly" means that the inboard middle lateral groove 19 is continuous to the inboard shoulder slot 23 smoothly when the inboard middle lateral groove 19 is expanded axially outwardly along its groove shape.

As illustrated in FIG. 1, the inboard middle lateral grooves 19 and the outboard middle lateral grooves 17 are arranged alternately in the circumferential direction of the tire. Thus, snow-shearing force can be generated by the respective lateral grooves 17 and 19 in turn to further improve on-snow performance. Each circumferential region of the inboard middle lateral grooves 19 does not overlap with any circumferential regions of the outboard middle lateral grooves 17.

In this embodiment, the inboard middle lateral grooves 19 are arranged in the same locations as the outboard shoulder lateral grooves 16 in the circumferential direction of the tire. Furthermore, the inboard middle lateral grooves 19 incline in an opposite direction to the outboard shoulder lateral grooves 16. Thus, the inboard middle lateral grooves 19 and the outboard shoulder lateral grooves 16 generate snow-shearing force simultaneously. Also, although lateral force in mutually opposite directions is generated by the respective lateral grooves 19 and 16, these lateral forces are offset, and thus an excellent steering stability on snow can be obtained. As described above, in the present embodiment, by providing not only lateral grooves which are shifted in the circumferential direction of the tire but also lateral grooves arranged in the same locations in the circumferential direction of the tire in good balance, the tire can generate large snow-shearing force in short pitches to further improve on-snow performance.

The inboard middle lateral grooves 19 incline in an opposite direction to the inboard shoulder lateral grooves 18. Lateral force in mutually opposite directions generated by the respective lateral grooves 19 and 18 are offset, and thus an excellent on-snow performance can be obtained.

Preferably, a groove width W8 of the inboard middle lateral grooves 19 is in a range of from 3.0% to 6.0% of the tread width TW. Similarly, a groove depth (not illustrated) of the inboard middle lateral grooves 19 is preferably in a range of from 3 to 8 mm, more preferably being smaller than those of the main grooves.

The central land portion 14 is disposed between the inboard middle main groove 6 and the outboard middle main groove 4. The central land portion 14 is provided with central lateral grooves 20 connecting the inboard middle main groove 6 and the outboard middle main groove 4. Thus, the central land portion 14 is configured as a row of blocks where central blocks 14B which are divided by the inboard middle main groove 6, the outboard middle main groove 4 and the central lateral grooves 20 are arranged in the circumferential direction of the tire.

The central lateral grooves 20 extend in a straight shape. The central lateral grooves 20 may be useful to maintain sufficient rigidity of the central land portion 14. The central land portion 14 is subject to receive large ground contact pressure during straight traveling ahead. Thus, the straightly extending central lateral grooves 20 can generate large snow-shearing force to offer better traction and braking performance. Accordingly, on-snow performance of the tire can further be improved.

In this embodiment, the central lateral grooves 20 are in communication with the short sides 4B of the outboard middle main groove 4. This structure may be useful to maintain sufficient rigidity of the central land portion around the central lateral grooves 20.

Preferably, a groove width W9 of the central lateral grooves 20 is in a range of from 1.5% to 4.5% of the tread width TW in order to further improve the above effect. Similarly, a groove depth (not illustrated) of the central lateral grooves 20 is preferably in a range of from 3 to 9 mm, more preferably being smaller than those of the main grooves.

The central blocks 14B are provided with central slots 24 extending axially inwardly from the inboard middle main groove 6 and terminating within the central land portion 14.

The central slots 24 according to the embodiment include groove widths gradually decreasing toward the tire equator C.

The central slots 24 are continuous to the inboard middle lateral grooves 19 smoothly through the inboard middle main groove 6. Thus, lengthy groove spaces in the axial direction of the tire can be obtained by the central slots 24, the inboard middle main groove 6 and the inboard middle lateral grooves 19. Here, "a central slot is continuous to an inboard middle lateral grooves smoothly" means that the inboard middle lateral groove 19 is continuous to the central slot 24 smoothly when the inboard middle lateral groove 19 is expanded toward the tire equator C along its groove shape. In this embodiment, the inboard shoulder slots 23, the central slots 24 and the inboard middle lateral grooves 19 form lengthy groove spaces in the axial direction of the tire.

Preferably, an axial maximum length L4 of the central slots 24 is in a range of from 10% to 20% of the axial maximum width Wd of the central land portion 14. Preferably, a circumferential maximum width W13 of the central slots 24 is in a range of from 2% to 7% of the tread width TW. Furthermore, a depth (not shown) of the central slots 24 is preferably 3 to 7 mm.

Each land portion 10 to 14 according to the present embodiment is provided with sipes. The sipes may include longitudinal sipes 26 extending in the circumferential direction of the tire and lateral sipes 27 extending along each lateral groove 16 to 20. The longitudinal sipes 26 are provided on the outboard shoulder land portion 10 and the inboard shoulder land portion 12 only. The lateral sipes 27 are provided on each land portion 10 to 14.

While preferred embodiments in accordance with the present invention have been described in detail, the present invention is not limited to the illustrated embodiments, but can be modified and carried out in various aspects.

EXAMPLE

Pneumatic tires of 195/65R15 having a basic structure illustrated in FIG. 1 were manufactured based on the detail shown in Table 1, and then handling performance on snow of each test tire was tested. The common specification of the tires and the test procedures are as follows.

Tread width TW: 164 mm
Outboard shoulder lateral groove width W5/tread width TW: 3.2% to 5.1%
Outboard shoulder lateral groove depth: 9.4 mm
Outboard middle lateral groove width W6/tread width TW: 2.8% to 4.4%
Outboard middle lateral groove depth: 8 mm
Inboard middle lateral groove width W8/tread width TW: 3.8% to 5.4%
Inboard middle lateral groove depth: 8 mm
Circumferential maximum width W10 of outboard shoulder lug grooves/tread width TW: 3.8%
Maximum length L1 of outboard shoulder lug grooves/maximum width Wa of outboard shoulder land portion: 10%
Circumferential maximum width W11 of outboard middle lug grooves/tread width TW: 3.8%
Maximum length L2 of outboard middle lug grooves/maximum width Wb of outboard middle land portion: 35%
Each lug groove depth: 5.7 mm
Circumferential maximum width W12 of inboard shoulder slots/tread width TW: 3.5%
Maximum length L3 of inboard shoulder slots/maximum width We of inboard shoulder land portion: 10%
Circumferential maximum width W13 of central slots/tread width TW: 3.8%
Maximum length L4 of central slots/maximum width Wd of central land portion: 15%
Each slot depth: 5.7 mm Handling Performance on Snow:

Each test tire was installed to a four-wheel-drive vehicle having a displacement of 2,400 cc under the following conditions. Then, a test driver drove the vehicle on a compacted snow road of a test course, and evaluated the handling stability and grip performance by his feeling. The test result are indicated using a score based on Ref. 1 being 100. The larger the value, the better the performance is.

Rim (all wheel): 15×6 J
Internal pressure (all wheel): 200 kPa
Speed: 20 to 120 km/h
The test result are shown in Table 1.

TABLE 1

Figure 5:
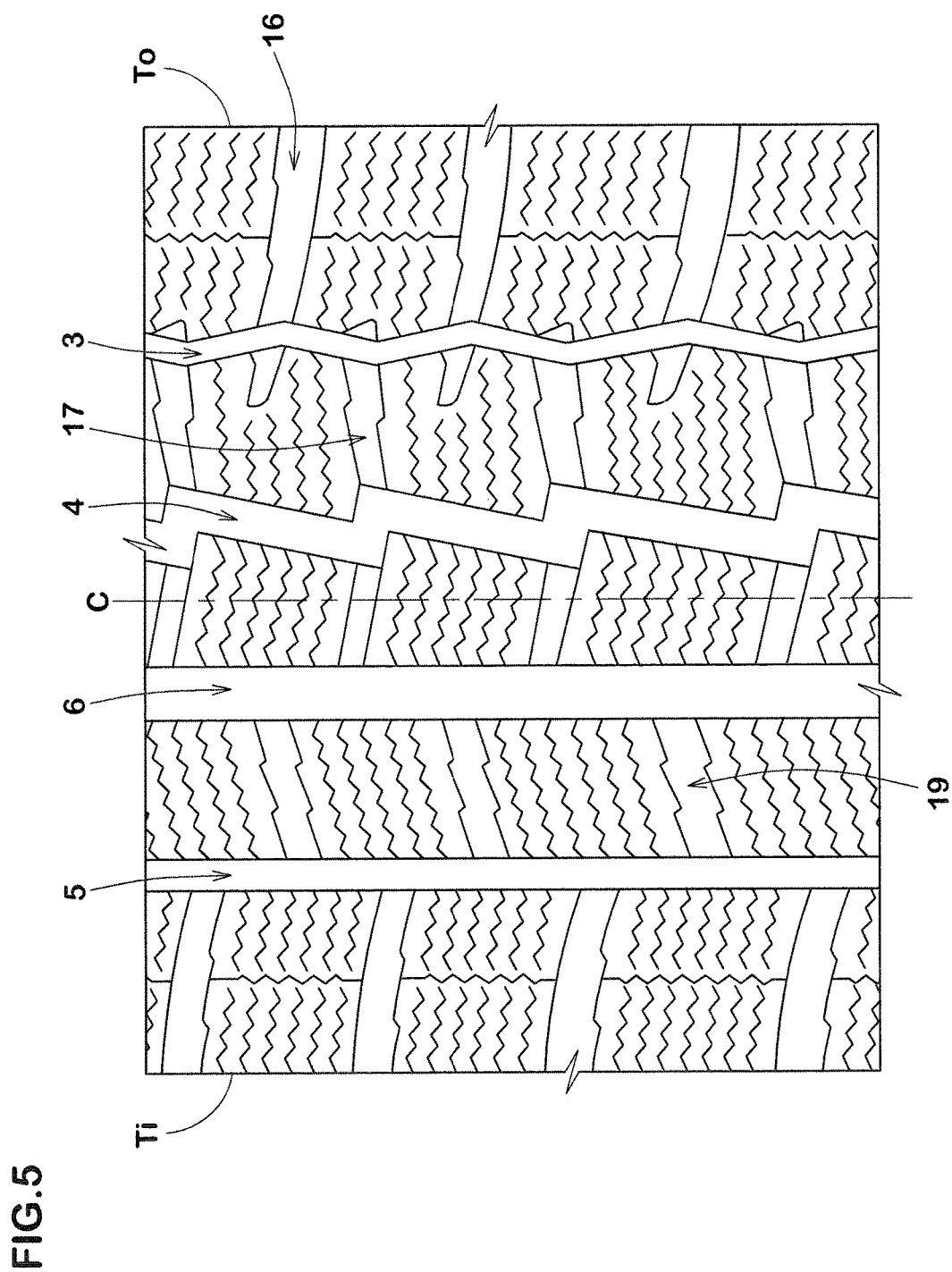
FIG. 5 is a development view of a tread portion of another embodiment of the present invention.
Figure 6:
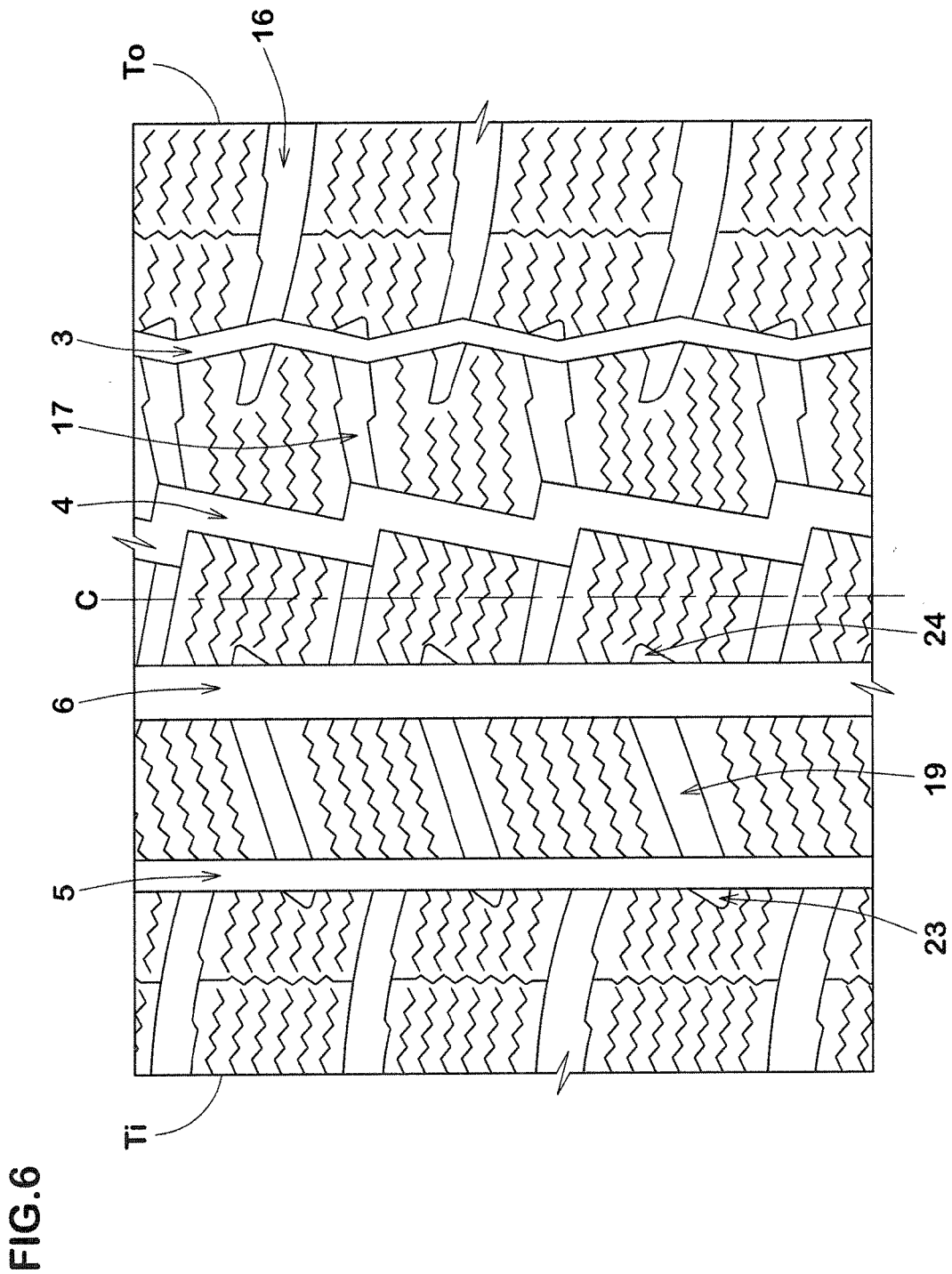
FIG. 6 is a development view of a tread portion of yet another embodiment of the present invention.
Figure 7:
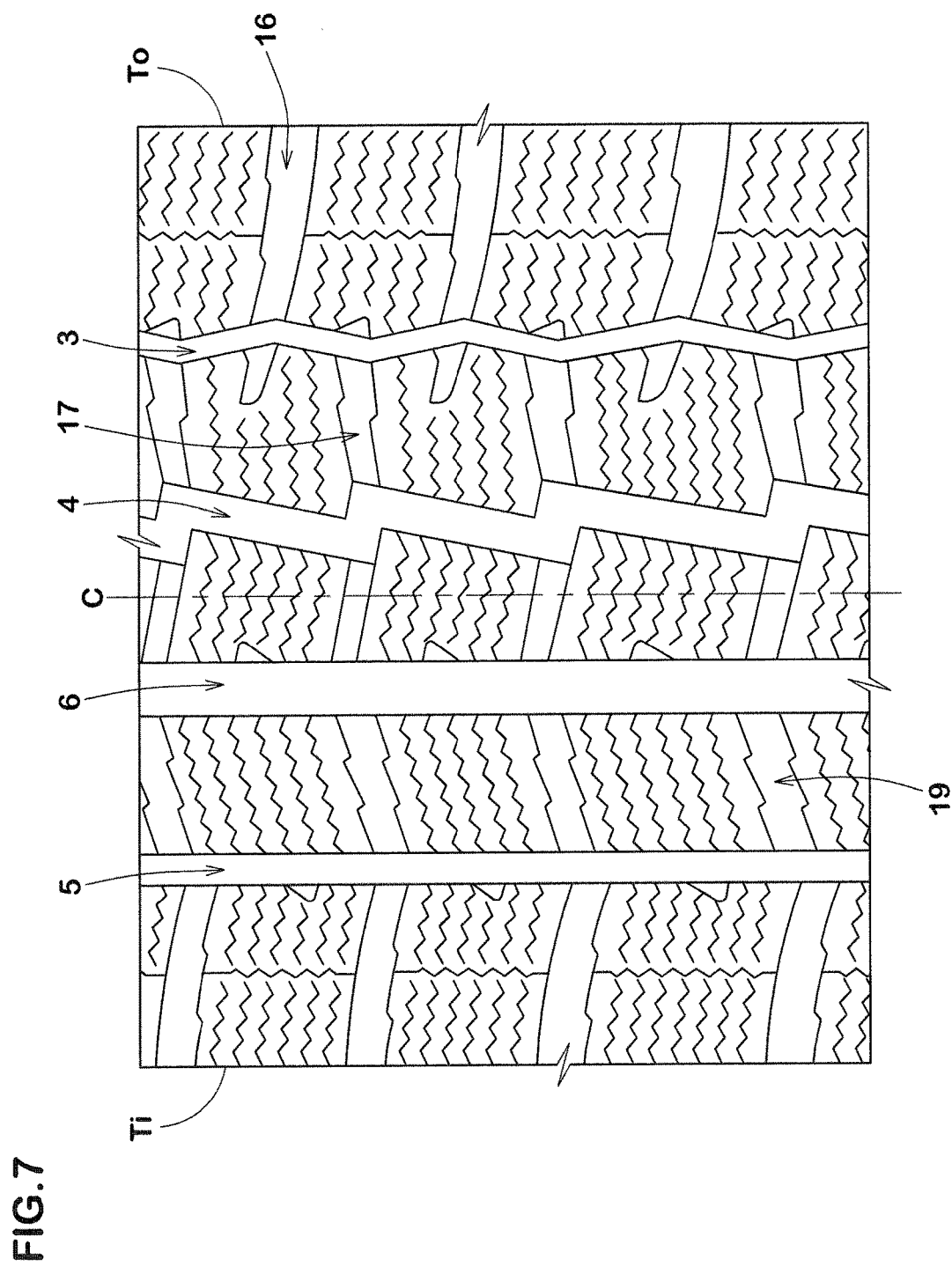
FIG. 7 is a development view of a tread portion of yet another embodiment of the present invention.
Figure 8:
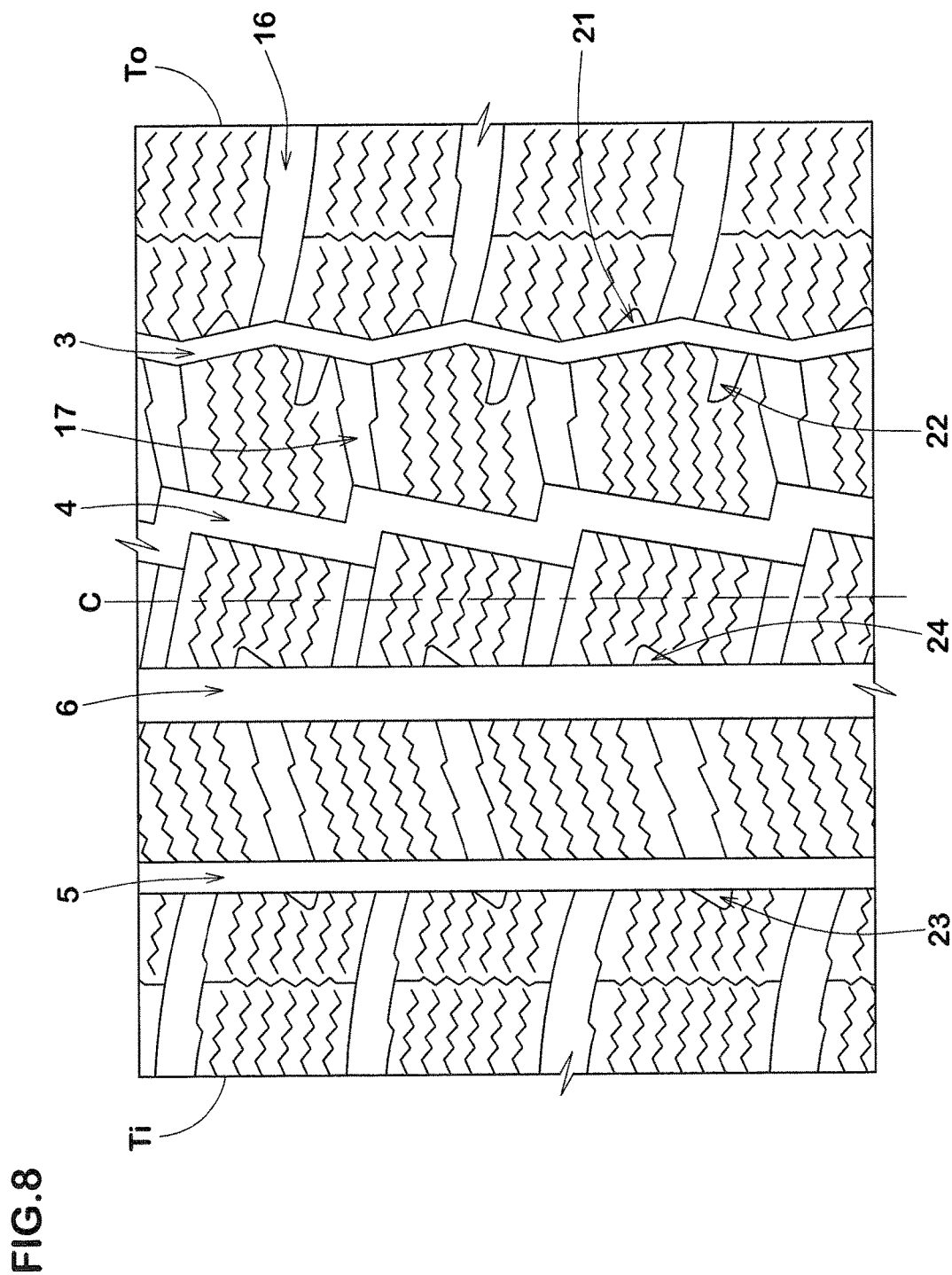
FIG. 8 is a development view of a tread portion of the embodiment of a comparative example.
Figure 9:
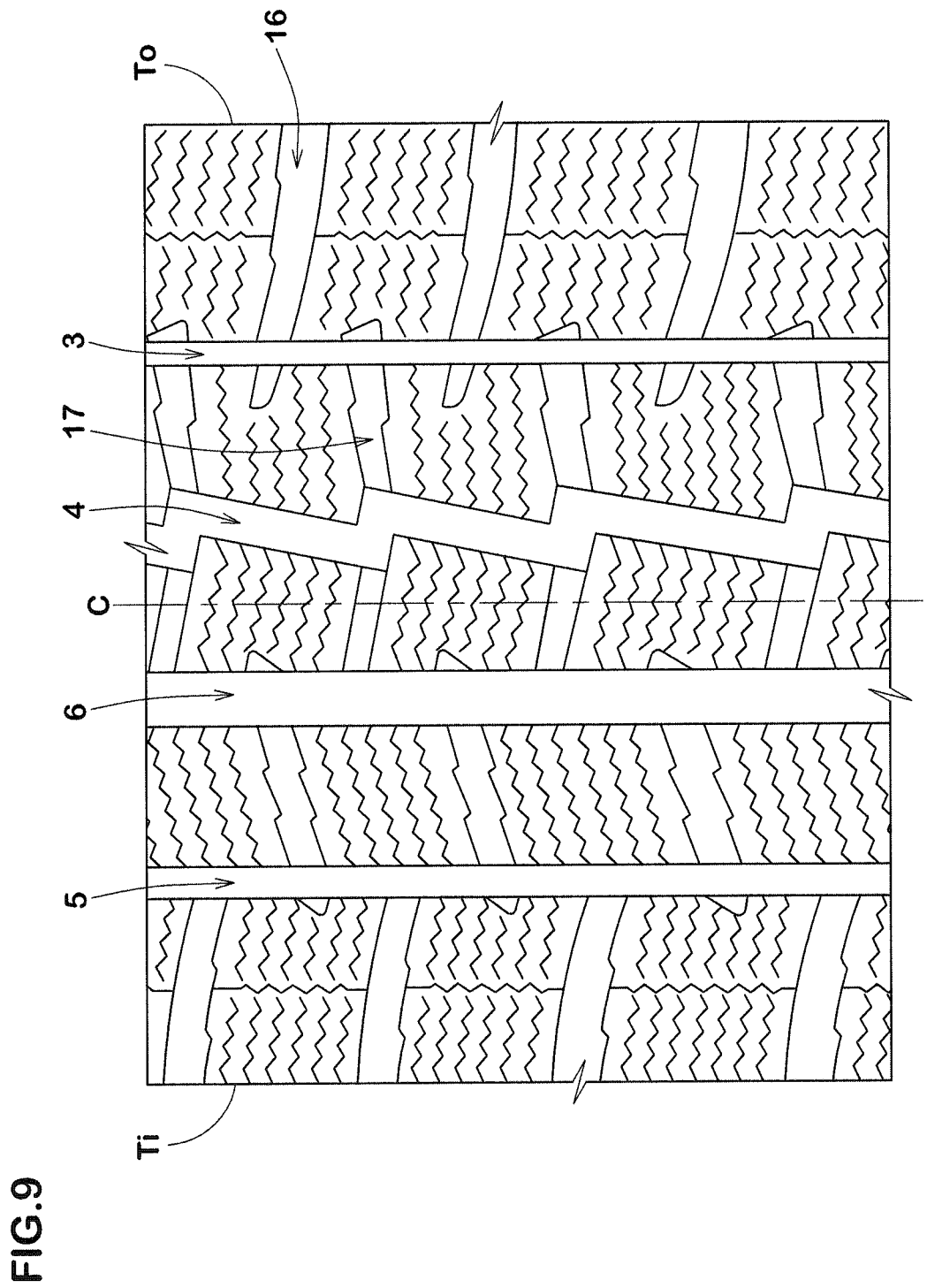
FIG. 9 is a development view of a tread portion of the embodiment of another comparative example.
Figure 10:
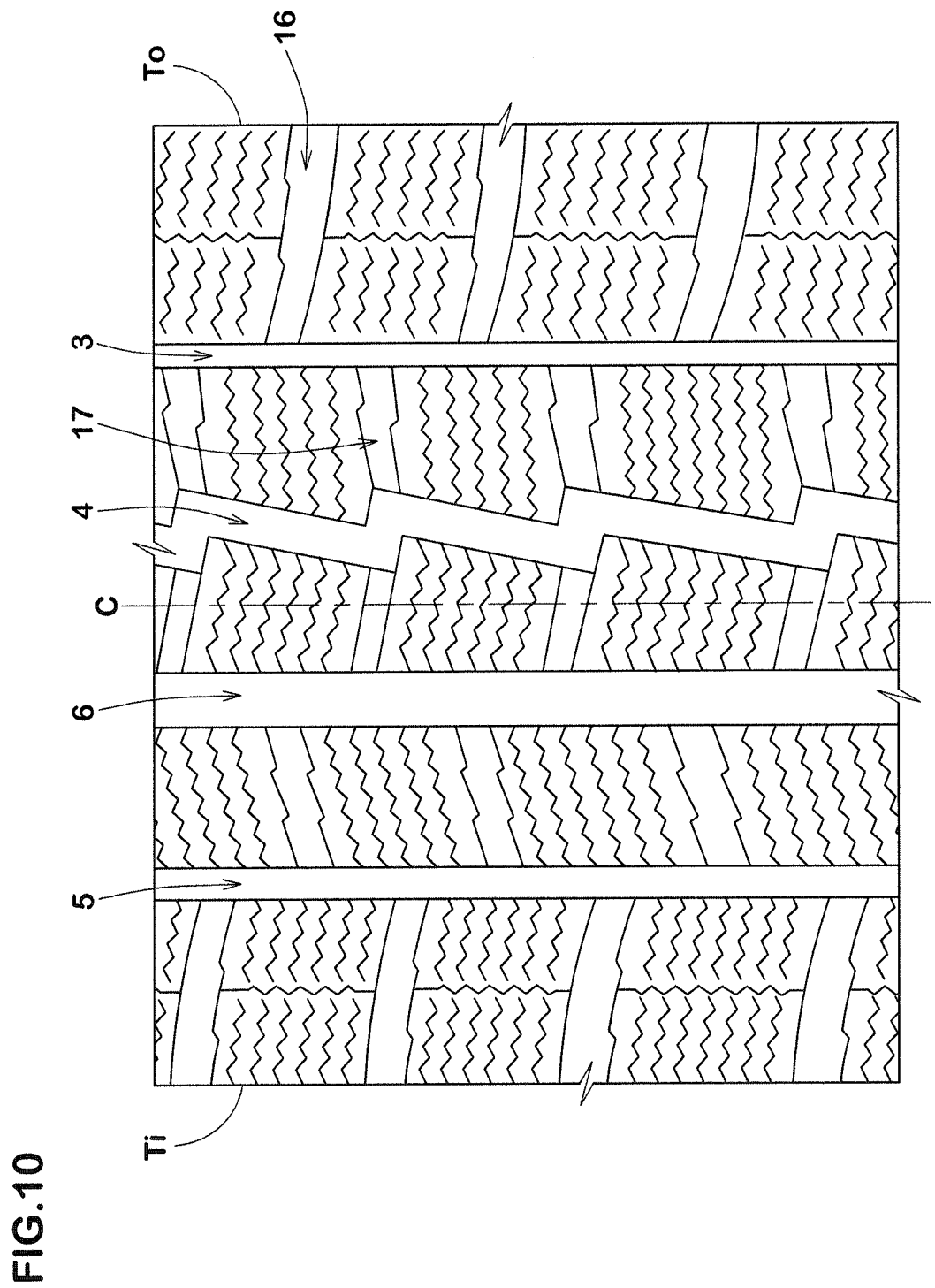
FIG. 10 is a development view of a tread portion of the embodiment of another comparative example.

| | Ex. 1 | Ref. 1 | Ref. 2 | Ref. 3 | Ex. 2 | Ex. 3 | Ex. 4 |
|---|---|---|---|---|---|---|---|
| Figure illustrating tread pattern | FIG. 1 | FIG. 10 | FIG. 8 | FIG. 9 | FIG. 5 | FIG. 6 | FIG. 7 |
| On-snow performance [Score] | 120 | 100 | 106 | 105 | 110 | 112 | 115 |

From the test results, it was confirmed that the example tires were significantly improved as compared with the comparative example tires.

REFERENCE SIGNS LIST

2 Tread portion
3 Outboard shoulder main groove
4 Outboard middle main groove
10 Outboard shoulder land portion
11 Outboard middle land portion
16 Outboard shoulder lateral groove
17 Outboard middle lateral groove
21 Outboard shoulder lug groove
22 Outboard middle lug groove

The invention claimed is:
1. A pneumatic tire comprising:
a tread portion having an installing direction to a vehicle to have an outboard tread edge and an inboard tread edge;
the tread portion being provided with a circumferentially and continuously extending zigzag outboard shoulder main groove on a nearest side of the outboard tread edge, a circumferentially and continuously extending outboard middle main groove between the outboard shoulder main groove and a tire equator, a plurality of outboard shoulder lateral grooves connecting the outboard tread edge and the outboard shoulder main groove and a plurality of outboard middle lateral grooves connecting the outboard middle main groove and the outboard shoulder main groove, thereby the tread portion comprising an outboard shoulder land portion comprising a circumferentially arranged outboard shoulder blocks defined by the outboard shoulder main groove, the outboard tread edge and the outboard shoulder lateral grooves and an outboard middle land portion comprising circumferentially arranged outboard middle blocks defined by the outboard shoulder main groove, the outboard middle main groove and the outboard middle lateral grooves;

the outboard shoulder blocks provided with outboard shoulder lug grooves extending axially outwardly from the outboard shoulder main groove and terminating within the outboard shoulder blocks;

the outboard middle blocks provided with outboard middle lug grooves extending axially inwardly from the outboard shoulder main groove and terminating within the outboard middle blocks;

the outboard shoulder lateral grooves being continuous to the outboard middle lug grooves smoothly through the outboard shoulder main groove; and the outboard middle lateral grooves being continuous to the outboard shoulder lug grooves smoothly through the outboard shoulder main groove, wherein:

the tread portion is further provided with a circumferentially and continuously extending inboard shoulder main groove on a nearest side of the inboard tread edge, a circumferentially and continuously extending inboard middle main groove between the inboard shoulder main groove and the tire equator and a plurality of inboard middle lateral grooves connecting the inboard shoulder main groove and the inboard middle main groove, the tread portion comprises an inboard shoulder land portion between the inboard shoulder main groove and the inboard tread edge, the inboard shoulder land portion is provided with inboard shoulder slots extending axially outwardly from the inboard shoulder main groove and terminating within the inboard shoulder land portion, the inboard shoulder slots are continuous to the inboard middle lateral grooves smoothly through the inboard shoulder main groove, and each of the outboard shoulder lateral grooves and the outboard middle lateral grooves comprises a portion having a width increasing gradually axially outwardly.

2. The pneumatic tire according to claim 1, wherein the outboard shoulder lateral grooves are in communication with outer zigzag vertexes, which protrude axially outwardly, of the outboard shoulder main groove, and the outboard middle lateral grooves are in communication with inner zigzag vertexes, which protrude axially inwardly, of the outboard shoulder main groove.

3. The pneumatic tire according to claim 1, wherein the inboard middle lateral grooves and the outboard middle lateral grooves are alternately arranged in a circumferential direction of the tire.

4. The pneumatic tire according to claim 3, wherein the tread portion comprises a central land portion between the inboard middle main groove and the outboard middle main groove, the central land portion is provided with central slots extending axially inwardly from the inboard middle main groove and terminating within the central land portion, and the central slots are continuous to the inboard middle lateral grooves smoothly through the inboard middle main groove.

5. The pneumatic tire according to claim 1, wherein the outboard shoulder lateral grooves incline in an opposite direction to the outboard middle lateral grooves.

6. The pneumatic tire according to claim 2, wherein the inboard middle lateral grooves and the outboard middle lateral grooves are alternately arranged in a circumferential direction of the tire.

7. The pneumatic tire according to claim 1, wherein the tread portion comprises a central land portion between the inboard middle main groove and the outboard middle main groove, the central land portion is provided with central slots extending axially inwardly from the inboard middle main groove and terminating within the central land portion, and the central slots are continuous to the inboard middle lateral grooves smoothly through the inboard middle main groove.

8. The pneumatic tire according to claim 2, wherein the outboard shoulder lateral grooves incline in an opposite direction to the outboard middle lateral grooves.

9. The pneumatic tire according to claim 3, wherein the outboard shoulder lateral grooves incline in an opposite direction to the outboard middle lateral grooves.

10. The pneumatic tire according to claim 4, wherein the outboard shoulder lateral grooves incline in an opposite direction to the outboard middle lateral grooves.

11. A pneumatic tire comprising:

a tread portion having an installing direction to a vehicle to have an outboard tread edge and an inboard tread edge;

the tread portion being provided with a circumferentially and continuously extending zigzag outboard shoulder main groove on a nearest side of the outboard tread edge, a circumferentially and continuously extending outboard middle main groove between the outboard shoulder main groove and a tire equator, a plurality of outboard shoulder lateral grooves connecting the outboard tread edge and the outboard shoulder main groove and a plurality of outboard middle lateral grooves connecting the outboard middle main groove and the outboard shoulder main groove, thereby the tread portion comprising an outboard shoulder land portion comprising a circumferentially arranged outboard shoulder blocks defined by the outboard shoulder main groove, the outboard tread edge and the outboard shoulder lateral grooves and an outboard middle land portion comprising circumferentially arranged outboard middle blocks defined by the outboard shoulder main groove, the outboard middle main groove and the outboard middle lateral grooves;

the outboard shoulder blocks provided with outboard shoulder lug grooves extending axially outwardly from the outboard shoulder main groove and terminating within the outboard shoulder blocks;

the outboard middle blocks provided with outboard middle lug grooves extending axially inwardly from the outboard shoulder main groove and terminating within the outboard middle blocks;

the outboard shoulder lateral grooves being continuous to the outboard middle lug grooves smoothly through the outboard shoulder main groove; and the outboard middle lateral grooves being continuous to the outboard shoulder lug grooves smoothly through the outboard shoulder main groove, wherein:
the tread portion is further provided with a circumferentially and continuously extending inboard shoulder main groove on a nearest side of the inboard tread edge, a circumferentially and continuously extending inboard middle main groove between the inboard shoulder main groove and the tire equator and a plurality of inboard middle lateral grooves connecting the inboard shoulder main groove and the inboard middle main groove,
the tread portion comprises a central land portion between the inboard middle main groove and the outboard middle main groove,
the central land portion is provided with central slots extending axially inwardly from the inboard middle main groove and terminating within the central land portion,
the central slots are continuous to the inboard middle lateral grooves smoothly through the inboard middle main groove, and
each of the outboard shoulder lateral grooves and the outboard middle lateral grooves comprises a portion having a width increasing gradually axially outwardly.

12. A pneumatic tire comprising:
a tread portion having an installing direction to a vehicle to have an outboard tread edge and an inboard tread edge;
the tread portion being provided with a circumferentially and continuously extending zigzag outboard shoulder main groove on a nearest side of the outboard tread edge, a circumferentially and continuously extending outboard middle main groove between the outboard shoulder main groove and a tire equator, a plurality of outboard shoulder lateral grooves connecting the outboard tread edge and the outboard shoulder main groove and a plurality of outboard middle lateral grooves connecting the outboard middle main groove and the outboard shoulder main groove, thereby the tread portion comprising an outboard shoulder land portion comprising a circumferentially arranged outboard shoulder blocks defined by the outboard shoulder main groove, the outboard tread edge and the outboard shoulder lateral grooves and an outboard middle land portion comprising circumferentially arranged outboard middle blocks defined by the outboard shoulder main groove, the outboard middle main groove and the outboard middle lateral grooves;
the outboard shoulder blocks provided with outboard shoulder lug grooves extending axially outwardly from the outboard shoulder main groove and terminating within the outboard shoulder blocks;
the outboard middle blocks provided with outboard middle lug grooves extending axially inwardly from the outboard shoulder main groove and terminating within the outboard middle blocks;
the outboard shoulder lateral grooves being continuous to the outboard middle lug grooves smoothly through the outboard shoulder main groove; and
the outboard middle lateral grooves being continuous to the outboard shoulder lug grooves smoothly through the outboard shoulder main groove,
wherein:
the tread portion is further provided with a circumferentially and continuously extending inboard shoulder main groove on a nearest side of the inboard tread edge, a circumferentially and continuously extending inboard middle main groove between the inboard shoulder main groove and the tire equator and a plurality of inboard middle lateral grooves connecting the inboard shoulder main groove and the inboard middle main groove,
the tread portion comprises an inboard shoulder land portion between the inboard shoulder main groove and the inboard tread edge,
the inboard shoulder land portion is provided with inboard shoulder slots extending axially outwardly from the inboard shoulder main groove and terminating within the inboard shoulder land portion,
the inboard shoulder slots are continuous to the inboard middle lateral grooves smoothly through the inboard shoulder main groove, and
the outboard shoulder lateral grooves incline in an opposite direction to the outboard middle lateral grooves.

13. A pneumatic tire comprising:
a tread portion having an installing direction to a vehicle to have an outboard tread edge and an inboard tread edge;
the tread portion being provided with a circumferentially and continuously extending zigzag outboard shoulder main groove on a nearest side of the outboard tread edge, a circumferentially and continuously extending outboard middle main groove between the outboard shoulder main groove and a tire equator, a plurality of outboard shoulder lateral grooves connecting the outboard tread edge and the outboard shoulder main groove and a plurality of outboard middle lateral grooves connecting the outboard middle main groove and the outboard shoulder main groove, thereby the tread portion comprising an outboard shoulder land portion comprising a circumferentially arranged outboard shoulder blocks defined by the outboard shoulder main groove, the outboard tread edge and the outboard shoulder lateral grooves and an outboard middle land portion comprising circumferentially arranged outboard middle blocks defined by the outboard shoulder main groove, the outboard middle main groove and the outboard middle lateral grooves;
the outboard shoulder blocks provided with outboard shoulder lug grooves extending axially outwardly from the outboard shoulder main groove and terminating within the outboard shoulder blocks;
the outboard middle blocks provided with outboard middle lug grooves extending axially inwardly from the outboard shoulder main groove and terminating within the outboard middle blocks;
the outboard shoulder lateral grooves being continuous to the outboard middle lug grooves smoothly through the outboard shoulder main groove; and
the outboard middle lateral grooves being continuous to the outboard shoulder lug grooves smoothly through the outboard shoulder main groove,
wherein:
the tread portion is further provided with a circumferentially and continuously extending inboard shoulder main groove on a nearest side of the inboard tread edge, a circumferentially and continuously extending inboard middle main groove between the inboard shoulder main groove and the tire equator and a plurality of inboard middle lateral grooves connecting the inboard shoulder main groove and the inboard middle main groove,
the tread portion comprises a central land portion between the inboard middle main groove and the outboard middle main groove, the central land portion is provided with central slots extending axially inwardly from the inboard middle main groove and terminating within the central land portion,
the central slots are continuous to the inboard middle lateral grooves smoothly through the inboard middle main groove, and
the outboard shoulder lateral grooves incline in an opposite direction to the outboard middle lateral grooves.

* * * * *